(12) United States Patent
Andrecola

(10) Patent No.: US 8,778,850 B2
(45) Date of Patent: Jul. 15, 2014

(54) BIODEGRADABLE NON-REACTIVE OIL-WELL STIMULATION FLUID AND METHOD OF USE

(71) Applicant: Paul Andrecola, Pennsauken, NJ (US)

(72) Inventor: Paul Andrecola, Pennsauken, NJ (US)

(73) Assignee: Green Earth Technologies, Inc., Celebration, FL (US)

( * ) Notice: Subject to any disclaimer, the term of this patent is extended or adjusted under 35 U.S.C. 154(b) by 0 days.

(21) Appl. No.: 14/062,882

(22) Filed: Oct. 24, 2013

(65) Prior Publication Data

US 2014/0121137 A1    May 1, 2014

Related U.S. Application Data

(60) Provisional application No. 61/717,694, filed on Oct. 24, 2012.

(51) Int. Cl.
| | | |
|---|---|---|
| *C09K 8/52* | (2006.01) | |
| *C09K 8/02* | (2006.01) | |
| *C09K 8/68* | (2006.01) | |
| *C09K 8/60* | (2006.01) | |
| *C09K 8/584* | (2006.01) | |
| *C09K 8/64* | (2006.01) | |
| *E21B 37/06* | (2006.01) | |
| *E21B 43/16* | (2006.01) | |
| *E21B 37/00* | (2006.01) | |

(52) U.S. Cl.
USPC ............. 507/90; 507/103; 507/203; 507/261; 507/262; 507/265; 507/266; 507/267; 507/905; 507/929; 507/930; 507/931; 507/937; 166/304; 166/305.1; 166/311; 166/312

(58) Field of Classification Search
CPC .......... C09K 8/52; C09K 8/524; C09K 8/602; C09K 2208/10; Y10S 507/905; Y10S 507/927; Y10S 507/929; Y10S 507/93; Y10S 507/931; Y10S 507/932; Y10S 507/938
USPC ........... 507/90, 103, 203, 261, 262, 265, 266, 507/267, 905, 927, 929, 930, 931, 937; 166/304, 305.1, 311, 312; 175/65
See application file for complete search history.

(56) References Cited

U.S. PATENT DOCUMENTS

| | | |
|---|---|---|
| 5,152,907 A | 10/1992 | Dulaney et al. |
| 7,008,917 B2 | 3/2006 | Heise et al. |
| 7,380,606 B2 | 6/2008 | Pursley et al. |
| 7,392,844 B2 | 7/2008 | Berry et al. |
| 7,632,785 B2 | 12/2009 | Dyer |
| 7,998,911 B1 | 8/2011 | Berger et al. |
| 2002/0106390 A1* | 8/2002 | Huglin et al. ............. 424/401 |
| 2005/0277572 A1* | 12/2005 | Heise et al. .............. 510/501 |
| 2010/0221194 A1* | 9/2010 | Loupenok ................. 424/45 |

* cited by examiner

*Primary Examiner* — Aiqun Li
(74) *Attorney, Agent, or Firm* — Johan O. Brag; Innova Law, LLC.

(57) ABSTRACT

Formulation for a natural product as a replacement for the use of traditional acidic chemical stimulation methods for the emulsification, removal and release of paraffin and asphaltenes from low producing or pumped off wells and reservoirs with the use of traditional methodologies. Also a method of use of formulation for stimulating an oil well consisting of introducing into the wellbore a biodegradable, non-reactive fluid system containing a water-miscible fatty acid solvent, a solution of fatty acids, an amino alcohol, and at least one non-ionic surfactant. The fluid system may be further in the form of a nanoemulsion that is formed by combining a colloidal solution with one or more emulsifiers, an alcohol, and water. The fluid system may be used in well remediation and stimulation as well as additional, alternative applications such as the cleaning of surface and/or downhole equipment.

10 Claims, No Drawings

BIODEGRADABLE NON-REACTIVE OIL-WELL STIMULATION FLUID AND METHOD OF USE

FIELD OF THE INVENTION

The invention relates to a non-reactive stimulation fluid system and process of treating an oil or gas well having a wellbore with a biodegradable fluid system comprising an organic solvent, a fatty acid and a surfactant. The biodegradable fluid system is in the form of a nanoemulsion.

BACKGROUND OF THE INVENTION

Remediation refers to the treatment of geological formations to improve the recovery of hydrocarbons from well damage and arterial blockage caused by the precipitation and deposition of heavy organic molecules from petroleum fluids. Heavy organic molecules such as asphaltenes, asphaltogenic acids, diamondoids and derivatives, mercaptans, organometallics, paraffin waxes and resins exist in crude oils in various quantities and forms. Such compounds could separate out of the crude oil solution due to various mechanisms and deposit, causing fouling in the oil reservoir, in the well, in the pipelines and in the oil production and processing facilities. Solid particles suspended in the crude oil may stick to the walls of the conduits and reservoirs reducing oil production from the wells. Well damage caused by the precipitation and deposition of paraffin and asphaltenes have been a recurrent problem in the production of crude oil and can be caused by a number of standard oilfield operations. The addition of large volumes of cold fluids during acidizing and fracturing operations in low bottom hole temperature wells can cause an irreversible process of paraffin deposition and subsequent formation damage. The standard practice of hot oiling producing wells for the removal of paraffin from the tubing producing wells for the removal of paraffin from the tubing string is another source of potential damage to a well's producing capacity. Asphaltene deposition in the formation and well bore area results from the use of hydrochloric acid during acidizing, addition of low surface tension organic liquids such as diesel, kerosene, or gasoline and the use of $CO_2$ injection for EOR projects. Paraffin deposits consist of a mixture of linear and branched chained hydrocarbons in the range of $C_{18}H_{38}$ to $C_{60}H_{122}$, generally mixed with other organic and inorganic materials such as crude oil, gums, resins, asphaltic material, salt, sand, clay and water. The accumulation of paraffin wax on the formation face and the near well bore area of the formations leads to a decrease in permeability and production of crude oil. Paraffin precipitates from the crude oil at an equilibrium temperature and pressure defined as the cloud point.

Chemical control of these problems relies upon the use of 4 categories of chemicals. Solvents are generally used to dissolve existing deposits and usually contain a high aromatic content. They dissolve a specific weight of paraffin based upon the molecular weight of the wax, temperature, and pressure before the solvent power is exhausted.

Dispersants do not dissolve paraffin deposits but rather break them up into much smaller particle sizes where they can be reabsorbed by the oil stream. Dispersants may diffuse several times their own weight in paraffin but do not have the widespread application of solvents. Generally, given the proper testing techniques a chosen dispersant will prove to be more cost-effective than solvents.

Detergents are a class of surface active agents that work in the presence of water to water-wet paraffin particles, formation, tubing and flowlines. These agents break up deposits and prevent them from reagglomerating back together further downstream in the system.

Stimulation refers to the removal of unwanted deposits from the wellbore and production equipment. Remediation includes hydrogen sulfide mitigation. Such unwanted deposits form and/or accumulate in the wellbore, production and recovery equipment and well casing. Under static reservoir conditions, asphaltenes are normally held in a stable suspension by resins, a family of polar molecules. However, changes in fluid temperature and pressure that are associated with oil production from the reservoir may cause the asphaltenes to flocculate and precipitate out of suspension and adsorb to the rock or pipe surfaces creating production problems for producers by reducing production rates and increasing the possibility of expensive mechanical failure. In addition to asphaltenes, other undesirable downhole products form such as scale, paraffins, fines, pipe dope, sulfur, heavy oil tar by-products and water blocks. Such accumulated deposits affect oil well productivity. Remediation treatment fluids are further typically used to remove such undesired deposits prior to the introduction of stimulation fluids. The chemical additives serve to disperse and break-up solid components within the drilling fluid. In addition, they serve to decrease surface activity between the two fluids.

In the past, attempts have been made to remove the paraffin and/or asphaltene by mechanically cutting it out of the well or using a so-called "hot-oiling" technique. The cutting procedure is a relatively crude procedure and requires extensive well shutdown time. Moreover, it is extremely inefficient inasmuch as substantial amounts of paraffin and/or asphaltene remain in the well. This remaining paraffin and/or asphaltene provides seed crystals which promote the rapid formation of additional paraffin and/or asphaltene. Consequently, paraffin and/or asphaltene builds up and the blocking situation quickly occurs again.

In the hot-oiling method, produced crude is heated to a temperature well above the melting point of the paraffin and/or asphaltene and is then circulated down through the annulus of the well and returned to a hot-oil heating truck via the production tubing. The purpose here is for the hot oil to melt and/or dissolve the paraffin so that it can be removed from the well in liquid form. This is an expensive method since the crude must be put through a heater treater along with a demulsifier in order to facilitate the removal of solids and water therefrom. In this method, the crude oil used is taken from the stock tank and has thus already made one pass through the treating facility and has already been demulsified. Another disadvantage to this method is that in many instances, 100% of the fluid injected is not recovered and thus some is lost to the reservoir.

During the hot-oiling process, a paraffin dispersant which is based on a petroleum sulfonate is added to the crude as it is being heated. The paraffin dispersant assists in dispersing the melted paraffin in the hot-oil phase.

Moreover, this technique is very dangerous, particularly with wells producing a crude having a low flash point. Indeed, such wells cannot be hot-oiled because the auto-ignition temperature of the oil is so low. Thus, bringing the oil in direct contact with a heating mechanism creates a substantial fire hazard.

Another procedure that has been tried is the so-called "hot acid" technique. In this process, an attempt is made to melt paraffin using a combination of hot water, heated xylene and hot acid. However, while this mixture may have some effect on the removal of carbonate scale build-up in wells, it has not presented a satisfactory answer to paraffin and/or asphaltene removal.

An additional disadvantage of each of the above methods is due to the fact that normally it is desirable to subject a well to acidization at some subsequent point in time after the paraffin and/or asphaltene removal. The mechanical cutting technique, hot-acid technique, and the hot-oil techniques leave the well bore, the area surrounding the well bore casing and tubing "oil wet". This is a disadvantageous situation for subsequent acidization. In the acidization technique, a mineral acid solution is introduced into the well to remove mineral deposits. The acid solution is aqueous and, if the interior portions and mechanical elements of the well are oil wet, direct contact of these surfaces with the acid solution is inhibited making the acidization treatment much less effective. Such stimulation of oil and gas wells is a well known process and is described in U.S. Pat. No. 4,541,483.

Other more recent prior art attempts have been made trying to overcome the presence of the undesirable paraffin and/or asphaltene and scale in oil wells and associated equipment as stated below. In U.S. Pat. No. 3,930,539 there is disclosed a method for increasing the production in wells by the utilization of hydrochloric and phosphoric acid followed by ammonia to create a violent exothermic reaction at the bottom of the well and thus disintegrate the limestone and emulsify the paraffin thereby creating larger passages in the formation and which permits greater flow. This is not desirable since the reactions themselves create safety hazards and the paraffin still remains.

In U.S. Pat. No. 4,836,286, there is disclosed a method of removing flow-restricting matter such as paraffins from wells by use of a three stage process of introducing various solvent solutions into the bottom of the well over a period of time and then removing the solvents there from and passing an electrical charge there through followed by the reintroduction into the well. This has the disadvantage of numerous steps and the use of electrical charge.

In U.S. Pat. No. 6,593,279, there is disclosed the use of an acid based emulsion for cleaning oil sludges from well cuttings, well formations and down hole wells. These emulsions contain water, a surfactant mixture, an oil, a solvent, and an oxidizer. There is no disclosure of the removal of scale.

In U.S. Pat. No. 4,278,129, there is disclosed a two stage process of stimulating an oil well by the use of an oxyalkylated phosphate ester surfactant followed by the introduction of a hydrocarbon to drive the ester into the formation.

In U.S. Pat. No. 4,813,482, there is disclosed a method of removing paraffin from an oil well by treating the well with a heated solution containing a surfactant, a hydrocarbon solvent, and water in order to disperse the paraffin with the well into the solution.

In U.S. Pat. No. 5,909,774, there is disclosed a method of cleaning up a producing interval of a well bore drilled using a synthetic oil-water emulsion drill-in fluid. This method involves the use of three treatment fluids in three separate stages.

In U.S. Pat. No. 6,112,814, there is disclosed a method for cleaning a well bore plugged with deposits of heavy hydrocarbons and finely-divided inorganic solids by circulating a surfactant composition containing an alkyl polyglycoside, an ethoxylated alcohol, a caustic and an alkyl alcohol through the well bore with a coiled tubing.

In U.S. Pat. No. 7,296,627 there is disclosed a process for the simultaneous removal of asphaltene, paraffin and scale using an aqueous cleaning emulsion comprising of water, hydrocarbon solvent, detergent and mineral acid.

Well treatment fluids presently used for removing unwanted deposits drilling of hydrocarbons such as asphaltenes and paraffins from the wellbore, are either not biodegradable or are less efficacious than desired. Typically, producers perform systematic removal treatments to overcome the effects of asphaltene deposits. Historically, xylene has been used to remove these organic deposits; however, xylene does not change the wettability of the rock surface, resulting in treatment effectiveness that is often short-lived. Further, xylene mixtures have a low flash point (77-84° F.) and contain objectionable components such as benzene, ethyl benzene and toluene (BETX). There is a continued need for more effective methods and systems for enhancement of oil recovery, wellbore remediation and formation stimulation. In particular, there is a need for new systems that are biodegradable.

Nanoemulsions have been discovered to be useful to the oil field. More particularly water-in-oil (W/O), oil-in-water (O/W) and other classes of nanoemulsions have found beneficial application in drilling, completion, well remediation and other oil and gas industry related operations. Additionally, nanoemulsions may reduce friction pressure losses, as well as reduce subsidence of solid weight material during oil and gas operations. Nanoemulsions have many physical properties that distinguish them from other emulsions. Due to their small mean droplet size, which is often smaller than optical wavelengths of the visible spectrum (thus less than about 400 nm), nanoemulsions usually appear transparent or translucent to the naked eye, even at high droplet volume fractions. The terms sub-micron emulsion (SME) and mini emulsion are sometimes used as synonyms for the term nanoemulsion. Nanoemulsions have great potential for use as cleaning agents. Nanoemulsions can typically be formulated using less surfactant than is required for many micro emulsions.

A nanoemulsion may be defined as a type of emulsion wherein the dispersed/discontinuous phase has a mean droplet size of less than 1000 nm; the components of the continuous and dispersed/discontinuous phases must be immiscible enough to allow for the respective phase formation. Nanoemulsions are typically prepared by imparting sufficient shear to reduce the droplet size of the immiscible internal phase below 1000 nm. This may involve the use of a high speed mixer, a high pressure homogenizer, a high frequency ultrasonic device or a small pore membrane. Nanoemulsions are prepared by providing an external energy input to the oil/water/surfactant system using high shear stress or inertial disruption to overcome the effect of interfacial tension and reach the levels of Laplace pressure of droplets having the expected size to fragment large micro scale droplets into the nanoscale. An excess of surfactant may be present in the continuous phase in the form of micelles that dissociate into monomers that rapidly adsorb on the newly created surface area of the nanoemulsion sized droplets and coat the interfacial film, thereby preventing shear-induced coalescence. The concentration of surfactant in the system also plays a role in determining the limiting droplet size when all other parameters are fixed. Apparatus suitable for preparing the nanoemulsions by mechanical energy input include, but are not limited to, devices offering a high power density with a small and well defined disruption zone.

Asphaltenes are aromatic-based hydrocarbons of amorphous structure. They are present in crude oils in the form of colloidally dispersed particles. The central part of the asphaltene micelle consists of high molecular weight compounds surrounded and peptized by lower weight neutral resins (maltenes) and aromatic hydrocarbons). Asphaltenes are lyophobic with respect to low molecular weight paraffinic hydrocarbons and lyophillic with respect to aromatics and resins. Asphaltene deposits in near wellbore subterranean formations, in well tubing and perforations, and in transfer lines, storage tanks, surface equipment, and pipelines hinder production and transport of high asphaltenic crudes from wells. Various compositions and treatments have been proposed and used for removing these deposits, but new treatments are needed; especially treatments which are non-reactive chemically with subterranean formations, environmentally friendly, inexpensive, easy to use, and effective.

SUMMARY OF THE INVENTION

Improved efficiency in well remediation and stimulation is evidenced by the introduction of a biodegradable non-reactive fluid system into the wellbore. The fluid system has applicability in the removal of pipe dope and hydrocarbons, oil based, and synthetic oil based drilling muds and the disbursement of paraffins and asphaltenes.

The fluid system comprises a blend of micellar solution of fatty acids, a vegetable oil solvent and one or more surfactants. The preferred fatty acids are fatty acids from coconut oil, tall oil or a blend of C8-C16 fatty acids such as oleic or linoleic acids. In a preferred embodiment, tall oil is the preferred fatty acid.

The fluid system typically contains one or more surfactants. The emulsifying agent is preferably non-ionic.

The fluid system may further consist of an oil-in-water nanoemulsion formed by combining the solvent, fatty acid/vegetable oil blend and surfactants with water/brine. The nanoemulsion may also contain an alcohol.

DETAILED DESCRIPTION

The Stimulation Fluid System

The biodegradable fluid used in the invention increases the production of hydrocarbons from oil and gas wells by managing undesirable downhole products encountered during the production of hydrocarbons from such reservoirs such as asphaltenes and paraffins.

The stimulation fluid composition contains the following components:
(a) at least one water-miscible vegetable oil/fatty acid solvent;
(b) at least one ionic surfactant which is the product of the saponification of at least one fatty acid by an amino alcohol;
(c) wherein the fluid droplet size is between 5 and 50 nm.

The system contains a fatty acid vegetable oil co-solvent micellar solution. A preferred vegetable oil/fatty acid solvent is tetrahydrofurfuryl alcohol (THFA) which is known to be readily biodegradable and environmentally benign.

The solvent is present at about 30 to about 50 weight percent of the solution, preferably 30 to about 35 weight percent of the solution. In a preferred embodiment, the weight ratio of solvent:surfactant is between from about 35:65 to 50:50, preferably 50:50.

The solvent is further combined with at least one surfactant. The at least one surfactant is the product of the saponification of at least one fatty acid by an amino alcohol in a water-soluble organic solvent.

The preferred amino alcohol is an ethanolamine. The most preferred amino alcohol is monoethanolamine.

The amino alcohol is present at about 30 to about 50 weight percent of the solution, preferably 30 to about 35 weight percent of the solution. In a preferred embodiment, the weight ratio of amino alcohol:fatty acid is 50:50.

The preferred fatty acids are those C8-C20 fatty acids including edible vegetable oils. Such oils may have a melting point of −10° C. or less. Preferred edible vegetable oils are selected from the group consisting of corn, coconut, mustard, palm kernel oil, neem, niger seed, olive, peanut, poppy seed, safflower, rapeseed, sesame, soybean, sunflower seed, wheat germ oil and other polyunsaturated containing oils (such as oleic acid, linoleic acid, erucic acid and linolenic acid).

The C8-C20 fatty acids may further be a mixture of fatty acids. Edible vegetable oils containing a high proportion of lauric acid (C-12 fatty acid) are often preferred. Coconut oil, which is comprised principally of lauric acid is a preferred C8-C20 fatty acid. Tall oil which is principally comprised of oleic, linoleic and linolenic acids is the most preferred C8-C20 fatty acid. Such fatty acids are non-toxic and biodegradable. Tall oil is commercially available as MWV L-5®, marketed by MeadWestvaco, which comprises at least 95% tall oil fatty acid and less than 5% rosin acids. Any suitable fatty acid may contain rosin acids present in small amounts not to exceed about 5% by weight of the total weight of the fatty acid.

The C8-C20 fatty acid is present at about 30 to about 50 weight percent of the solution, preferably at about 35 to about 40 weight percent.

The fluid system further contains thixotropic agents and pH adjusters, when needed. For instance, the blend may contain between 0 to about 10 weight percent of thickener. Preferred thixotropic agents are polysaccharide derivatives having nonionic functionalities such as alkyl alcohol or ether groups. Exemplary thickeners include methylcellulose, hydroxyethyl cellulose, hydroxypropyl cellulose, hydroxypropyl methylcellulose, cornstarch, hydroxyethyl cornstarch, and hydroxypropyl cornstarch.

The fluid system is generally a homogeneous liquid or gel at 0° C. and has a flash point in excess of 60° C., preferably in excess of 66° C.

The nanoemulsion exhibits both thermodynamic and kinetic stability at high temperatures. For instance, a clear stable nanoemulsion with a 50 volume percent loading of the fluid system has been demonstrated to be stable at 82° C. and to 4° C. for a period of several weeks.

The fluid system can also be used as a concentrate, and as such, it can be admixed with up to about 50 weight percent water prior to use. The fluid system may further be emulsified prior to use.

In particular, the fluid system used in the invention is in the form of a nanoemulsion, defined as a multiphase system consisting of water, fatty acid and vegetable oil blends, emulsifier(s), and alcohol, and is a transparent and thermodynamically stable liquid solution. In a preferred embodiment, the nanoemulsion of droplet type dispersions of oil-in-water has an average particulate size ranges in the order of about 5 to about 50 nm in drop radius. Nanoemulsions of the current disclosure are prepared by providing an external energy input to the oil/water/surfactant system using high shear stress or inertial disruption to overcome the effect of interfacial tension to fragment large micro scale droplets into the nanoscale. Unlike microemulsions, where the average drop size grows continuously with time so that phase separation ultimately occurs, the nanoemulsions of the current disclosure are thermodynamically and kinetically stable. The drops of microemulsion are generally large (>0.1 microns) and often exhibit a milky or cloudy, rather than a translucent, appearance as seen in nanoemulsions.

Preferred surfactants/emulsifiers are biodegradable and have an HLB (hydrophile-lipophile balance) value between from about 8 to about 18.

When employed, such surfactants may be present in the produced emulsion at a concentration in the range of about 200 ppm to about 10,000 ppm. When such surfactants are employed, they are present at about 30 to about 50 weight percent of the solution, preferably at about 35 to about 40 weight percent.

The surfactants can be anionic or nonionic as well as mixtures thereof. Blends of both non-ionic and anionic surfactants have been found to decrease droplet size in most instances. Where such a blend is used, a preferred ratio of non-ionic to anionic surfactant is about 5/95 to about 95/5, preferably about 50/50 to about 60/40.

Suitable non-ionic surfactants are those based on fatty alcohols. For instance, a preferred non-ionic emulsifier is of the fatty alcohol ethoxylate type such as one having 6-mole ethoxylation on a 12-carbon alcohol. An example of a particularly suitable fatty alcohol ethoxylate is tallow alcohol ethoxylate containing 2 or 3 moles of ethylene oxide.

Further suitable as the nonionic surfactants are alkyl and alkylaryl polyether alcohols such as linear or branched polyoxyethylene alcohols, more preferably linear polyoxyethylene alcohols, comprising (a) from about 8 to about 30, preferably about 8 to about 20, carbon atoms, and (b) comprising about 3 to about 50 moles, most preferably about 3 to about 20 moles, ethylene oxide. Most preferred non-ionic surfactants are linear polyoxyethylene alcohols having from about 13 to about 15 carbon atoms and comprising about 10 moles ethylene oxide. Further, preferred emulsifiers include nonylphenol ethoxylate having a HLB value of about 16 and comprising 20 ethylene oxide units per molecule, octylphenol ethoxylate having an HLB value greater than 13.5, and nonylphenol ethoxylate having a HLB value greater than 13.

In another preferred embodiment, the non-ionic surfactant/emulsifier are a combination of alcohol ethoxylates and a sorbitol ester of oleic acid. Preferably, the alcohol ethoxylate is based on C9-C11 synthetic alcohol and the sorbitol ester is based on oleic acid. In a most preferred embodiment, the non-ionic emulsifier is a trioleate ester of sorbitol and its anhydrides copolymerized with approximately 20 moles of ethylene oxide for each mole of sorbitol and sorbitol anhydrides. Further preferred as oil-in-water emulsifiers are polyoxyethylene sorbitan monopalmitate, polyoxyethylene sorbitan monostearate, polyoxyethylene sorbitan monooleate, linear alcohol alkoxylates, alkyl ether sulfates, linear nonylphenols, dioxane, ethylene glycol and ethoxylated castor oils such as polyethylene glycol castor oil, dipalmitoylphosphatidylcholine (DPPC), polyoxyethylene (8.6) nonyl phenyl ether, ethylene oxide sulfonates (i.e., alkyl propoxy-ethoxysulfonate), alkyl propoxy-ethoxysulfate, alkylarylpropoxy ethoxysulfonate and highly substituted benzene sulfonates.

While it is acknowledged that the emulsifiers outlined above cover a wide range of physical properties and provide wide ranging emulsification abilities, a balance between two quite different emulsifiers can produce a far greater effect than an intermediate emulsifier. For instance, especially desired results are obtained by use of a fatty alcohol and dioctyl sodium sulfosuccinate.

Highly alkaline compositions, such as concentrates having a high content of alkaline agents, such as alkali hydroxides, alkaline complexing agents and silicates, and having a pH value above 11, preferably above 13, are frequently used for cleaning of hard surfaces, for mercerization, scouring etc. A good wetting ability combined with a good cleaning effect is essential in the above-mentioned applications, which requires the presence of considerable amounts of suitable surfactants to lower the high surface tension caused by the high amount of electrolytes. It is also important to have a controlled foaming in these systems. To minimize the cost of transportation, these concentrates should contain as small amounts of water and other solvents as possible. It is also advantageous if the concentrates remain homogenous during transportation and storage.

Since these compositions contain high amounts of electrolytes, such as alkali and/or alkaline complexing agents, it is difficult to dissolve larger amounts of surfactants, especially nonionic surfactants. Therefore, in order to improve the solubility, hydrotropes are often added, and the most commonly used hydrotropes are ethanol and sodium xylene or cumene sulphonate. Ethanol is rather efficient, but presents an explosion hazard, and sodium xylene or cumene sulphonate is relatively inefficient at higher surfactant levels. If a surfactant that is soluble in alkaline water solutions without the addition of a hydrotrope is used, there will be a problem with too much foam, which requires the addition of a foam depressor.

The inventive compositions may also include one or more alkylpolyglucosides which are to be understood as including alkylmonoglucoside and alkylpolyglucoside surfactants based on a polysaccharide, which are preferablyone or more alkyl polyglucosides. These materials may also be referred to as alkyl monoglucosides and alkylpolyglucosides. Alkyl polyglucosides are known nonionic surfactants which are alkaline and electrolyte stable. Such include alkyl glucosides, alkyl polyglucosides and mixtures thereof. Alkyl glucosides and alkyl polyglucosides can be broadly defined as condensation articles of long chain alcohols, e.g., C8-C30 alcohols, with sugars or starches or sugar or starch polymers i.e., glucosides or polyglucosides. These compounds can be represented by the formula (S)n-O—R wherein S is a sugar moiety such as glucose, fructose, mannose, and galactose; n is an integer of from about 1 to about 1000, and R is a C8-30 alkyl group. Examples of long chain alcohols from which the alkyl group can be derived include decyl alcohol, cetyl alcohol, stearyl alcohol, lauryl alcohol, myristyl alcohol, oleyl alcohol and the like. Alkyl glucosides have earlier been used in highly alkaline compositions, see for example EP-B1-589 978, EP-A1-638 685 and U.S. Pat. No. 40,240,921. Furthermore, alkyl glucosides are well known as active cleaning agents in commonly used cleaning compositions, see e.g. WO 97/34971, U.S. Pat. No. 4,627,931 and EP-B1-075 995.

EP-B1-589 978 describes the use of C8-C14 alkyl glucosides as surface active auxiliaries in the desizing, bleaching and alkaline scouring of natural and/or synthetic sheet-form textile materials, yarns or flocks, while EP-A1-638 685 relates to a mercerizing wetting agent containing, either alone or in combination, a C4-C18 alkyl glycoside, a C4-C18 alkyl gluconic amide and the corresponding sulphonated derivatives. Liquid highly alkaline cleaning concentrates containing an alkyl glucoside or an alkyl glycidyl ether and surface active nonionic alkylene oxide adducts are described in U.S. Pat. No. 4,240,921.

U.S. Pat. No. 4,488,981 and EP-B1-136 844 describe the use of C2-C6 alkyl glucosides for reducing the viscosity of and preventing phase separation in an aqueous liquid detergent, for instance in liquid shampoos and soaps and in heavy duty liquids. The C2-C4 alkyl glycosides are the most preferred alkyl glycosides, since they are most effective in reducing the viscosity. Furthermore, in U.S. Pat. No. 5,525,256 and in Statuary Invention H 468 industrial and institutional alkaline liquid cleaning compositions containing C8-C25 alkyl glucosides as cleaning agents are described.

Preferably the alkylpolyglucosides are nonionic fatty alkylpolyglucosides which contain a straight chain or branched chain C8-C15 alkyl group, and have an average of from about 1 to 5 glucose units per fatty alkylpolyglucoside molecule.

More preferably, the nonionic fatty alkylpolyglucosides which contain straight chain or branched C8-C15 alkyl group, and have an average of from about 1 to about 2 glucose units per fatty alkylpolyglucoside molecule.

Examples of such alkylpolyglucosides as described above include, for example, APG™ 325 which is described as being a C9-C11 alkyl polyglucoside, also commonly referred to as D-glucopyranoside, (ex. Cognis). Further exemplary alkylpolyglucosides include Glucopon® 625 CS which is described as being a C10-C16 alkyl polyglucoside, also commonly referred to as a D-glucopyranoside, (ex. Cognis), lauryl polyglucoside available as APG™ 600 CS and 625 CS (ex. Cognis) as well as other materials sold under the Glucopon® tradename, e.g., Glucopon® 215, Glucopon® 225, Glucopon® 425, especially one or more of the alkyl polyglucosides demonstrated in one or more of the examples.

The addition of a salt to the fluid system reduces the amount of water needed and also lowers the freezing point of the well treatment nanoemulsion. Among the salts that may be added are NaCl, KCl, CaCl2, and MgCl. Others suitable salts can be formed from K, Na, Br, Cr, Cs and Bi metals.

The nanoemulsions may be prepared by subjecting the fatty acids, surfactants, alcohol and optional components to high intensity mechanical shear at room temperature, followed by successive membranes filtrations.

Furthermore, it will be understood that in some applications, it may be desirable to introduce the blend of fatty acids downhole where it will be combined with separately injected water/brine and water-based materials, such as surfactants and alcohol, to form the nanoemulsion in situ.

In well remediation applications, the fluid system is preferably injected directly into the wellbore through the production tubing or through the use of coiled tubing or similar delivery mechanisms. Once downhole, the well treatment fluid system remedies damage caused during well treating such as, for instance, by stimulation fluids and drilling fluid muds, by dispersing and removing fines, paraffin and/or asphaltene deposits, sulfur, pipe dope and unwanted hydrocarbons, such as heavy oil tar by-products and water blocks, from the formation and wellbore.

The bio-based system fluids are 100% biodegradable to carbon dioxide and water have low volatile organic compounds (VOCs) and have low aquatic toxicity. They are useful in environmentally sensitive areas.

From the foregoing, it will be observed that numerous variations and modifications may be effected without departing from the true spirit and scope of the novel concepts of the invention.

EXAMPLES

Purpose

To define the use of WELL WAKE UP!™ a natural product as a replacement for the use of traditional acidic chemical stimulation methods for the emulsification, removal and release of paraffin and asphaltenes from low producing or pumped off wells and reservoirs with the use of traditional methodologies.

Scope

To clean and remove buildup in the casing, perforations and formation through the use of traditional rig and opposing cup methodology. The cups will be set to wash the perforations at two foot intervals using approximately one barrel of fluid (produced water with diluted product) per foot in order to provide adequate pressure to push the fluid into the formation. The product should be pushed into the formation and soaked for 24 hours and then the well should be placed back into production. The well should be production tested one week after treatment. Testing should show increases in fluid production in excess of 50% greater than baseline pre-treatment testing.

Procedure

Product Mixture and Dilution

Begin the process with a mixture of WELL WAKE UP!™ A and B at a 50:1 dilution and introduce into the pumping mechanism associated with the chosen methodology. The quantity of product to be used should be one barrel of diluted product per linear foot of perforated pipe. The diluted product should be mixed in the holding tank for at least fifteen minutes prior to use in the well to allow for full and complete mixing. If the well bore allows, it is preferred that brine water should be used although diesel (#2 oil) may also be used where permitted Procedure MIRU on the well. Control well and pull rods, pump and tubing out of the well. Tag the well for fill to ensure there is no sand over the perforations. Set up the wash tool (either opposing cups with two foot intervals or hyper-clean head for the coil tubing unit). Run in the well with the wash tool and begin mixing product fifteen minutes prior to the wash tool reaching the lowest section of perforations within the well. Assure that WELL WAKE UP!™ has been properly mixed and diluted to a 50:1 ratio.

Begin washing the perforations and casing at one barrel of diluted product per one foot of perforated piping. Wash until all perforations have been fully treated with WELL WAKE UP!™. POOH with the wash tool, and set up a sand line. Run back into the well and tag for fill. Ensure that sands are not covering well perforations. If there is fill over the perforations, clean and remove the fill from the well.

Once completed, return well to production configuration and allow WELL WAKE UP!™ to soak for 12-24 hours for best result. After the treatment with WELL WAKE UP!™ is complete, the well should be placed on a test trap/test ball to chart and graph the flow and fluid levels post treatment. The resulting data will demonstrate the significant impact of WELL WAKE UP!™ on the flow of the well versus the baseline data. The well should be retested for flow and fluid level approximately one day after treatment with WELL WAKE UP!™.

Alternative Methodology

When removal of the rods or completion tubing is not practical, the well bore perforations and formation may be washed by the use of a high pressure pump fitted properly to the production pipe with all applicable safety equipment installed. Commence using the previously prepared solution of a 50:1 dilution of product and hot water or diesel. Apply product at a rate of 1 bbl per linear foot of perforation taking into account the well's bore, depth and ultimate fluid capacity.

The diluted product should be pumped down first, and pushed with additional hot water or diesel to adequately fill the bore and displace the liquid through the perforations. Pressure should be maintained until a noticeable drop off occurs indicating the fluid has been pushed through the perforations and into the formation.

Once completed, return well to production configuration and allow WELL WAKE UP!™ to soak for 12-24 hours but not to exceed 72 hours for best result. After the treatment with WELL WAKE UP!™ is complete, the well should be placed on a test trap/test ball to chart and graph the flow and fluid levels post treatment. The resulting data will demonstrate the significant impact of WELL WAKE UP!™ on the flow of the well versus the baseline data. The well should be retested for flow and fluid level approximately one day after treatment with WELL WAKE UP!™.

Examples

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims that follow.

Example 1: RN 66

Initial Product Mixture and Dilution

The mixing and dilution for RN 66 began with an equivalent dilution; 100 gallons of WELL WAKE UP!™ A and 100 gallons of WELL WAKE UP!™ B. It was calculated for RN 66 with surface stimulation using hot brine water (10 lb/gallon) at 3% solution of CaCl at 180 degrees Fahrenheit. The initial product dilution was 1:1 with brine water in preparation tank i.e. 200 gallons total product (100 gallons A plus 100 gallons B and 200 gallons of brine water). The product was placed into a 75 barrel tank with an additional 65 bbls brine water. The mixture was pumped down using a hot oil truck and the on board pump that achieved a 1 bbl/minute pumping rate.

Stimulation Procedure

Well RN 66 was treated with a surface pump stimulation methodology. Prior to treatment, a wire line was placed on the well to tag the fluid depth of the well. No fluid levels were found in the well bore and there was no reservoir pressure was detected. Once the above mentioned diluted product was mixed and introduced into the pump truck, it was continually pumped at approximately 1 bbl/minute until the entirety of the product had been introduced into the well bore. After a 20 minute soak period, an additional 195 bbls of brine at 180 degree Fahrenheit were pumped to completely fill the well bore. Approximately six hours after application, the well was revisited to check the well pressure. Upon inspection, it observed that there was gas bubbling with residual WELL WAKE UP!™ from the open flange at the top of the well. Pressure readings from the well determined a well pressure of 500 psi. This product dilution was allowed to soak for 24 hours. After the soak time, a wire line was again placed on the well to determine the fluid level, if any within the well bore. The fluid level was tagged at 6000 ft with a pressure reading of 500 psi. The well was then swabbed and put back into production.

Example 2: RN-89

Scope

To clean and remove buildup in the casing, perforations and formation through the use of the surface pump methodology. A concentrated formula of the product is pumped into the well tubing at 1 bbl of total dilute for each foot of perforation within the well. The concentrate is then followed by enough water to fill the entire tubing of the well plus an additional amount (based on the porosity of the formation) to push the product into the formation. The product should be soaked for 24 hours and then placed back into production. The well should be production tested one week after treatment. Testing should show increases in fluid production in excess of 50% greater than baseline pre-treatment testing if the well is in complete operational order.

DEFINITIONS

Surface pump application—Well treatment and cleaning methodology utilizing a surface pump, 1:1 product to brine dilution followed by the introduction of 180 degree Fahrenheit brine to fill the entirety of the well bore. The "heavy" brine water is used as a hydrostatic hammer to force both the product and brine through the perforations and into the well bore. A 12-24 hours soak time is implemented to ensure that the product has contacted all necessary fissures within the formation.

Procedure

Initial Product Mixture and Dilution

The mixing and dilution for RN 89 began with an equivalent dilution; 100 gallons of WELL WAKE UP!™ A and 100 gallons of WELL WAKE UP!™ B. It was calculated for RN 89 with surface stimulation using hot brine water (10 lb/gallon) at 3% solution of CaCl at 180 degrees Fahrenheit. The initial product dilution was 1:1 with brine water in preparation tank i.e. 200 gallons total product (100 gallons A plus 100 gallons B and 200 gallons of brine water). The product was placed into a 75 barrel tank with an additional 65 bbls brine water. The mixture was pumped down using a hot oil truck and the on board pump that achieved a 1 bbl/minute pumping rate.

Well RN 89 was treated with a surface pump stimulation methodology.

Prior to treatment, a wire line was placed on the well to tag the fluid depth of the well. No fluid levels were found in the well bore and there was no reservoir pressure was detected. Once the above mentioned diluted product was mixed and introduced into the pump truck, it was continually pumped at approximately 1 bbl/minute until the entirety of the product had been introduced into the well bore. After a 20 minute soak period, an additional 195 bbls of brine at 180 degree Fahrenheit were pumped to completely fill the well bore. Approximately six hours after application, the well was revisited to check the well pressure. Upon inspection, it observed that there was gas bubbling with residual WELL WAKE UP!™ from the open flange at the top of the well. Pressure readings from the well determined a well pressure of 500 psi. This product dilution was allowed to soak for 24 hours. After the soak time, a wire line was again placed on the well to determine the fluid level, if any within the well bore. The fluid level was tagged at 6000 ft with a pressure reading of 500 psi. The well was then swabbed and put back into production. The team was notified several days later that the flow and pressure from RN 89 had decreased from 500 psi to 250 psi and production was at 10 bbl per day. The following day, production and pressure had decreased to 0 bbls and 0 psi. A wire line was run and there was no fluid detected at 7500 ft. The well was swabbed and wire line run again. The fluid level was detected to be at 4500 ft. The well was shut in for one hour and then put back into production. After one hour, the pressure returned to 250 psi.

A paraffin sample was collected from RN 89 for analysis. Upon further inspection of the material, it was determined that it consisted mostly of long chain, dense paraffin that had been removed by the WELL WAKE UP!™ treatment. As the gas lifting mechanism hadn't been connected, the pressure in the formation wasn't enough to lift the paraffin and to the top of the well. The paraffin that had been removed from the formation was now beginning to build up throughout the tubing. A subsequent treatment with WELL WAKE UP!™ and the addition of the gas lift would eliminate the conglomeration of long chain paraffin's within the well.

Subsequent Treatments

As stated above in section 6.2, a subsequent treatment for the removal of formation paraffin from within the tubing was required. It was determined that the increase in paraffin and decrease in pressure could be treated and removed with the addition of 6.5 bbls of WELL WAKE UP!™ were to be added at a 20% dilution. This mixture was to be pumped down the tubing and followed by 25 bbls of brine water. The brine was followed by 70 bbls of diesel to completely fill the tubing. An additional "Post Treatment Pill" was utilized to remove a blockage within the well bore June 16th. Since the treatment, RN 89 is flowing 340 bbl/day of 1% (99% pure) sweet crude. There has been no blockage in this well in 25 days post treatment.

The invention claimed is:

1. A biodegradable fluid composition for oil well stimulation comprising:
   (a) a water-miscible and biodegradable solvent for vegetable oil-derived fatty acids;
   (b) at least one surfactant, wherein the at least one surfactant is the product of saponification of at least one C8-C20 fatty acid by an amino alcohol;
   (c) wherein the fluid droplet size is comprised between 5 and 50 nm; and
   (d) wherein the fluid composition removes paraffin and asphaltene deposits from the wellbore without chemically reacting with subterranean formations.

2. The fluid composition according to claim 1 wherein the water-miscible solvent is tetrahydrofurfuryl alcohol.

3. The fluid composition according to claim 1, wherein the amount of the water-miscible solvent is between about 30% and about 35% by weight of the total composition.

4. The composition according to claim 1, wherein the amino alcohol is monoethanolamine.

5. The composition according to claim 1, wherein the amount of the amino alcohol is between about 30% and about 35% by weight of the total composition.

6. The fluid composition according to claim 1, wherein the amount of the at least one fatty acid is between about 35% and about 40% by weight of the total composition.

7. The fluid composition according to claim 1, wherein the at least one fatty acid may contain rosin acids present in small amounts not to exceed about 5% by weight of the total weight of the at least one fatty acid.

8. The fluid composition according to claim 1, wherein the at least one fatty acid is tall oil.

9. The fluid composition according to claim 1 comprising at least one additional nonionic surfactant, wherein the at least one additional nonionic surfactant is a polyethylene oxide condensate of an alkylphenol.

10. The fluid composition according to claim 9, wherein the amount of the at least one additional nonionic surfactant is between about 45% and about 55% by weight of the total composition.

* * * * *